US009002634B1

(12) United States Patent
Kalyanasundaram et al.

(10) Patent No.: US 9,002,634 B1
(45) Date of Patent: Apr. 7, 2015

(54) NAVIGATION SERVICE IN SUPPORT OF MOBILE COMMUNICATION SESSIONS (71) Applicant: Verizon Patent and Licensing Inc., Basking Ridge, NJ (US)

(72) Inventors: Pramod Kalyanasundaram, Acton, MA (US); Kumar K. Vishwanathan, Acton, MA (US); Damascene M. Joachimpillai, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/104,036

(22) Filed: Dec. 12, 2013

(51) Int. Cl.
*G06F 7/00* (2006.01)
*G01C 21/20* (2006.01)
*H04W 28/02* (2009.01)

(52) U.S. Cl.
CPC ........... *G01C 21/20* (2013.01); *H04W 28/0226* (2013.01)

(58) Field of Classification Search
CPC ............... G06Q 30/02; G06Q 30/0241; H04L 12/4641; H04L 63/0272; H04L 63/166
USPC .................. 701/420; 709/202, 203, 227, 230; 370/401
See application file for complete search history.

(56) References Cited

U.S. PATENT DOCUMENTS

| | | | | |
|---|---|---|---|---|
| 8,739,243 B1* | 5/2014 | Martini | | 726/1 |
| 2012/0005577 A1* | 1/2012 | Chakra et al. | | 715/702 |
| 2012/0078727 A1* | 3/2012 | Lee | | 705/14.66 |
| 2012/0084151 A1* | 4/2012 | Kozak et al. | | 705/14.58 |
| 2012/0084348 A1* | 4/2012 | Lee et al. | | 709/203 |
| 2012/0084349 A1* | 4/2012 | Lee et al. | | 709/203 |
| 2013/0179205 A1* | 7/2013 | Slinin | | 705/7.13 |
| 2013/0262171 A1* | 10/2013 | Solodko et al. | | 705/7.18 |
| 2013/0340031 A1* | 12/2013 | Amit et al. | | 726/1 |
| 2014/0035723 A1* | 2/2014 | Alfar et al. | | 340/5.65 |
| 2014/0279596 A1* | 9/2014 | Waris et al. | | 705/317 |
| 2014/0317397 A1* | 10/2014 | Martini | | 713/153 |
| 2014/0337613 A1* | 11/2014 | Martini | | 713/151 |

* cited by examiner

*Primary Examiner* — Mcdieunel Marc (57) ABSTRACT

A method, a device, and a non-transitory storage medium having instructions to receive, by a network device, a request from a mobile device that includes data indicating a signal quality pertaining to a connection between the mobile device and a wireless network, data indicating a location of the mobile device, and data indicating a destination of a user of the mobile device; determine a route that yields a probability that a communication session between the mobile device and another device avoids communication dropout; and transmit a response that indicates the determined route.

20 Claims, 9 Drawing Sheets

NAVIGATION SERVICE IN SUPPORT OF MOBILE COMMUNICATION SESSIONS

BACKGROUND

With the advent of ubiquitous communication, it is commonplace for a user of a mobile device to place or receive a telephone call or other type of communication while the user is walking, traveling in a car, etc.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The Global Positioning System (GPS), as well as other location-based technologies, have been used to provide users with various services. For example, a location-based service may apply to a store locator service, a roadside assistance service, a proximity-based marketing service, as well as other services.

While users have embraced the concept of ubiquitous communication, this is somewhat misleading since a wireless communication is subject to blocked service (i.e., no service at all) and dropout due to various reasons, such as congestion, limitations in network coverage, propagation factors (e.g., path loss, shadowing, multipath fading, interference, etc.), wireless channel factors (e.g., handover, resource utilization, etc.), etc.

According to exemplary embodiments described herein, the location of a mobile device is used to minimize, if not eliminate, dropout of a session. The session of the mobile device may be a machine-to-machine session, a user-to-user session, or a user-to-network device session, etc. By way of further example, the session may be a telephone call, an audio/video communication between users, or an Instant Messaging (IM) communication, streaming of a program from a program server, or a monitoring of a utility meter.

According to an exemplary embodiment, a user may be directed, via the mobile device, to follow a route that affords a maximum probability that dropout does not occur. According to an exemplary use case, assume that a user is driving toward a destination and is using the navigational capabilities of the mobile device. For example, the mobile device includes a navigational application. During this time, the user needs to place an important telephone call to a client and wishes to minimize the potential of call dropout during the telephone call. When the user places the call via the mobile device, the mobile device uses the navigational application to provide a route that leads toward the destination and minimizes the probability of the call being dropped. For example, the user indicates, via the mobile device, that preventing call dropout is of a higher priority than reaching the destination according to some metric (e.g., shortest time, shortest distance, etc.).

Figure 1:
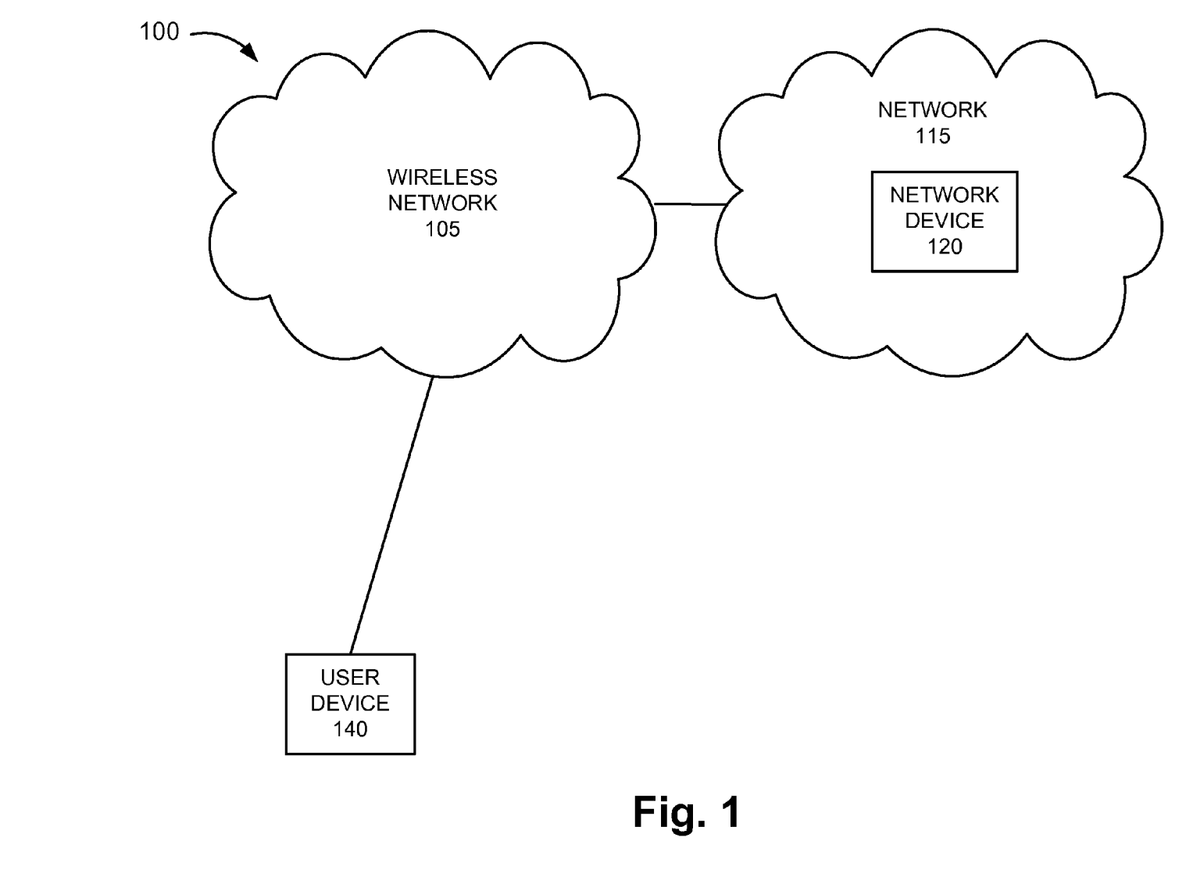
FIG. 1 is a diagram illustrating an exemplary environment in which exemplary embodiments may be implemented.

FIG. 1 is a diagram illustrating an exemplary environment 100 in which exemplary embodiments may be implemented. As illustrated, environment 100 includes a wireless network 105 and a network 115. Network 115 includes a network device 120. Environment 100 also includes a user device 140.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number and the arrangement of connections between the devices and the network of environment 100 are exemplary.

The number of devices and networks, and the configuration in environment 100 are exemplary. According to other embodiments, environment 100 may include additional devices, fewer devices, different devices, and/or differently arranged devices, than those illustrated in FIG. 1. For example, a single device in FIG. 1 may be implemented as multiple devices. According to other embodiments, environment 100 may include additional networks and/or different networks than those illustrated and/or described in reference to FIG. 1.

A device (e.g., user device 140, network device 120) may be implemented according to one or multiple network architectures (e.g., a client device, a server device, a peer device, a proxy device, and/or a cloud device). Also, according to other embodiments, one or more functions and/or processes described as being performed by a particular device may be performed by a different device, or some combination of devices.

Wireless network 105 includes a wireless network that provides access to a navigation service in support of the maintenance of mobile communication sessions, as described herein. Wireless network 105 may be implemented according to various wireless technologies and/or architectures, such as a cellular network, a non-cellular network, a $3^{rd}$ Generation (3G) network, a $4^{th}$ Generation (4G) network, etc. By way of further example, wireless network 105 may be implemented to include a Long Term Evolution (LTE) network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, and/or another type of wireless network (e.g., an ad hoc network, an LTE Advanced network, or future generation wireless network architecture).

Network 115 includes a network that hosts a navigation service in support of the maintenance of mobile communication sessions (also referred to herein as simply "navigation service"). Network 115 may be implemented to include a wireless network, a wired network, and/or an optical network. By way of example, network 115 may be implemented to include an Internet Protocol (IP) network, such as the Internet.

According to an exemplary embodiment, network device 120 provides the navigation service in support of the maintenance of mobile communication sessions. According to an exemplary embodiment, network device 120 stores network coverage data pertaining to wireless network 105. For example, the network coverage data indicates a geographic reach of service coverage pertaining to wireless network 105. The network coverage data may include network state data (e.g., a power outage, a crashed network device in wireless network 105, a network device in wireless network 105 that is down due to maintenance, congestion and/or load levels in wireless network 105, etc.), as well as other types of data that may impact network coverage, such as current weather conditions in a geographic area serviced by and proximate to wireless network 105, predictive communication arrivals based on historical data, etc.

According to an exemplary embodiment, network device 105 stores map data. For example, the map data supports a navigation service. The map data may support various map behaviors, modes of mobility (e.g., in a car, on a bicycle, pedestrian-based, etc.), and other forms of data that support the navigation service. The map data may include geographic coordinates of network devices (not illustrated) of wireless network 105. For example, the map data may indicate a geographic coordinate of a base station (not illustrated) of wireless network 105.

According to an exemplary embodiment, network device 105 calculates and selects routes for users with which to navigate according to various criteria. As described further below, the user may select particular levels of confidence regarding avoidance of communication dropout, in addition to other criteria that may be afforded by conventional navigational services, such as shortest route, fastest route, least monetary cost, etc.

According to an exemplary embodiment, network device 120 calculates a dropped communication probability (DCP). Network device 120 uses the dropped communication probability to select a route that best matches the user's criterion (e.g., a high confidence level of avoiding communication dropout) or the user's criteria (e.g., a moderate confidence level of avoiding communication dropout and shortest route). According to other exemplary embodiments, network device 120 selects a route that best matches the user's criterion or criteria without the use of a dropped communication probability.

According to an exemplary embodiment, network device 120 selects a route that minimizes (e.g., to some specified degree and/or confidence level) communication dropout based on the network coverage data and the map data. According to an exemplary embodiment, network device 120 receives data from user device 140. For example, the data includes location data indicating a location of user device 140 and signal quality data pertaining to a connection between user device 140 and wireless network 105. Network device 120 selects a route that minimizes communication dropout based on the location of user device 140 and the signal quality data. User device 140 may send to network device 120 other types of data, such as speed of travel and/or user device 140 capabilities (e.g., wireless technologies supported, whether user device 140 is a multimode device, etc.). Network device 120 may use these other types of data to select the route. For example, network device 120 may consider multiple wireless access technologies that exist in the same geographic location so as to select a route that would yield the lowest probability of communication dropout and/or satisfying the user's criteria.

According to an exemplary embodiment, network device 120 collects and stores historical dropped data pertaining to communication dropout. Network device 120 uses the historical dropped data to calculate a dropped communication probability and/or select a route. For example, the historical dropped data may include the conditions, state, or context that existed when a dropped communication occurred for users of the navigation service. The conditions are indicated by various data, such as the network state data, the location of user device 140, signal quality reported by user device 140, day and time, the type of communication session, weather conditions, etc.

Network device 120 may be implemented according to a centralized computing architecture, a distributed computing architecture, or a cloud computing architecture. Network device 120 may be implemented to include a server device, an analytics engine, and a storage system. According to other implementations, network device 120 may include different, additional, and/or fewer network elements that provide the functionalities described in support of an embodiment of the navigation service in support of the maintenance of mobile communication sessions.

According to an exemplary embodiment, user device 140 includes a mobile device that interfaces with wireless network 105 and is capable of using the navigation service. User device 140 may be implemented to include a smartphone, a tablet device, a netbook, a vehicular communication system within a vehicle (e.g., a car, a truck, etc.), a mobile phone, a computer, a Web device, or some other type of suitable wireless communicative device. According to an exemplary embodiment, user device 140 includes location-aware capabilities. According to an exemplary embodiment, user device 140 includes software in support of various types of communicative sessions (e.g., a softphone, a web browser, an IM client, a program player, etc.). According to an exemplary embodiment, user device 140 includes a navigation agent or client that supports the navigation service, as described further below.

Figure 2:
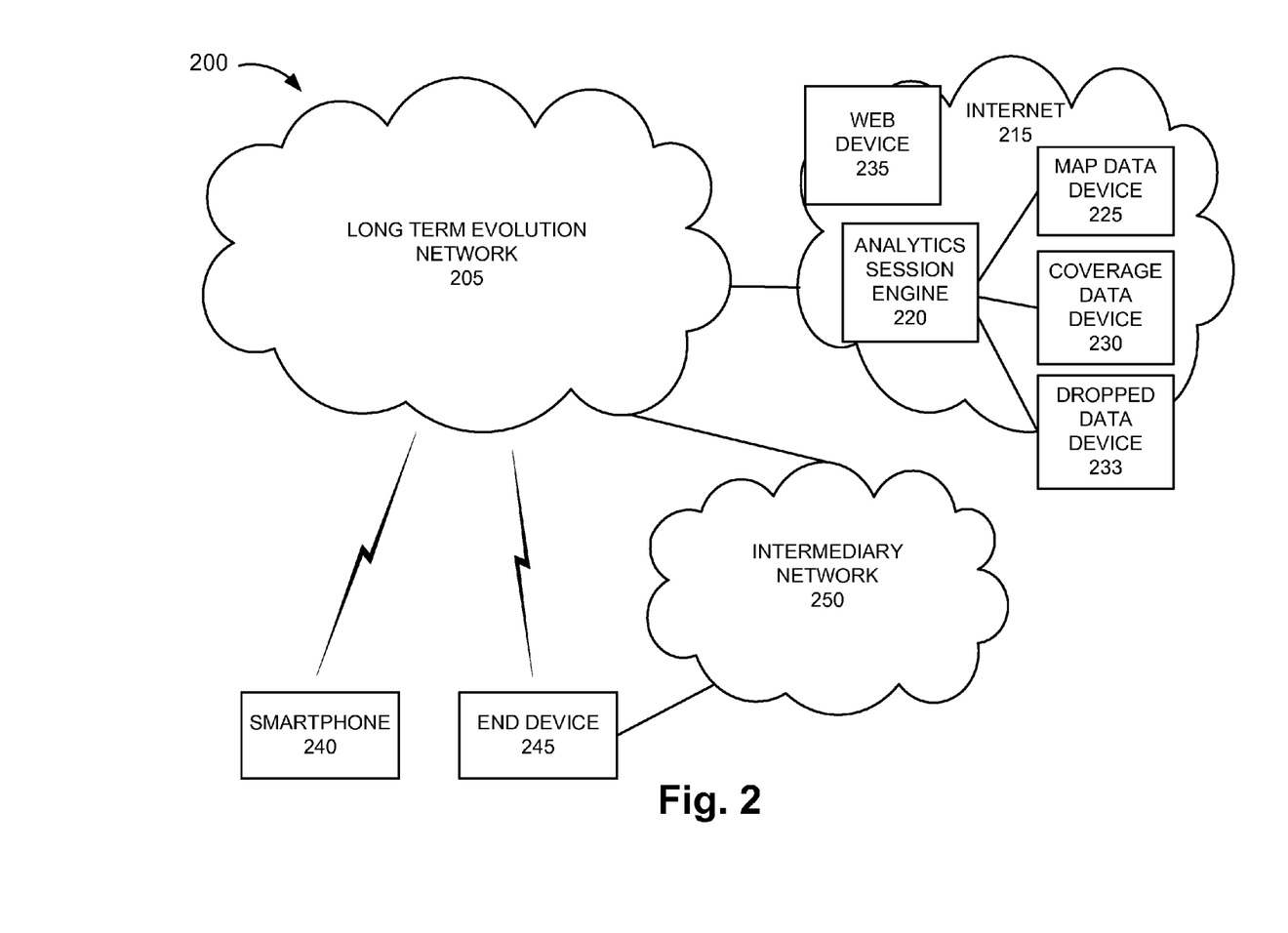
FIG. 2 is a diagram illustrating an exemplary implementation of the environment depicted in FIG. 1.

The navigation service in support of the maintenance of mobile communication sessions is described further below in view of an exemplary implementation of the embodiments described. FIG. 2 is a diagram illustrating an exemplary environment 200 in which exemplary embodiments of the navigation service may be implemented. As illustrated, environment includes an LTE network 205 and Internet 215. Internet 215 includes an analytics session engine 220, a map data device 225, a coverage data device 230, and a dropped data device 233. Internet 215 also includes a web device 235. As further illustrated, environment 200 includes a smartphone 240, an end device 245, and an intermediary network 250. The number and type of network devices 110, networks, user devices, and the configuration illustrated in FIG. 2 are exemplary. The connections illustrated in FIG. 2 are also exemplary.

LTE network 205 includes a wireless network that operates according to the LTE standard. For example, although not illustrated, LTE network 205 includes enhanced Node Bs (eNBs), serving gateways (SGWs), packet data network gateways (PGWs), a mobility management entity (MME), etc. Depending on the geographic area, LTE network 205 may include other network elements, such as a pico base station, femto base station, a relay station, or other types of wireless nodes.

Internet 215 hosts the network-side of the navigation service, which is provided by analytics session engine 220, map data device 225, coverage data device 230, and dropped data device 233. Analytics session engine 220 calculates a route in support of the maintenance of mobile communication sessions pertaining to a mobile device (e.g., smartphone 240). Analytics session engine 220 calculates the route based on data stored in map data device 225, coverage data device 230, and dropped data device 233. Analytics session engine 220 also calculates the route based on data (e.g., location, signal quality, etc.) received from smartphone 240.

According to an exemplary embodiment, analytics session engine 220 calculates a route based on a dropped communication probability. The dropped communication probability indicates a probability of the occurrence of a dropped communication (i.e., premature communication termination). The dropped communication probability may be calculated based on a Poisson probability function. Additionally, or alternatively, analytics session engine 220 calculates a dropped communication probability based on historical dropped data. For example, analytics session engine 220 calculates a dropped communication rate. The dropped communication rate is calculated based on a ratio of the number of dropped communications relative to the number of non-dropped communications. The dropped communication rate may be qualified based on various parameters, such as geographic location, day, time, type of session, etc. Additionally, or alternatively, the dropped call probability may be increased or decreased based on various parameters derived from the map data, the network coverage data, and the data received from smartphone 240. For example, signal quality reported, distance of smartphone 240 from a node (e.g., a base station) of LTE network 205, weather conditions, historical dropped data, load conditions, other context data, etc., all may be used to calculate a dropped communication probability relative to an instant in time or greater time period, a specific geographical area, a specific user device, etc.

Map data device 225 manages and stores the map data. Coverage data device 230 manages and stores the network coverage data. Dropped data device 233 manages and stores historical dropped data. For example, the historical dropped data indicates historical data pertaining to dropped communications. By way of further example, the historical dropped data indicates network state data, weather data, data received from mobile device, etc., dropped communication event data (e.g., type of session, location of mobile device, date, time, etc.), and other types of context data. Map data device 225, coverage data device 230, and/or dropped data device 233 may be implemented as database management system (DBMS) that supports, among other things, a data model, a query language, and controls data access, data integrity, etc. Map data, network coverage data, and/or historical dropped data of the database may be stored in various types of data structures (e.g., files, records, objects, tables, etc.). The database may also store metadata. Map data device 225, coverage data device 230, and dropped data device 233 may obtain the various types of data from various devices (e.g., user devices 140, network devices 110), third party devices, and personnel (e.g., network administrators, users, etc.).

Web device 235 includes an application/service server device. For example, web device 235 may host a website that provides a service that a user of smartphone 240 may use. Web device 235 is meant to be merely illustrative of a user device-to-network device type session. Smartphone 240 includes a smartphone device. End device 245 may correspond to a mobile device or some other type of end user device, which may or may not have wireless communicative capabilities (e.g., a Voice-over-Internet Protocol (VoIP) phone, a plain old telephone service (POTS), a computer, a utility meter, etc.). Intermediary network 250 may include a wired network that provides access to LTE network 205.

Described below are exemplary scenarios pertaining to the navigation service. Various functions are described as being performed by analytics session engine 220 and smartphone 240 to provide an exemplary embodiment of the navigation service.

Figure 3A:
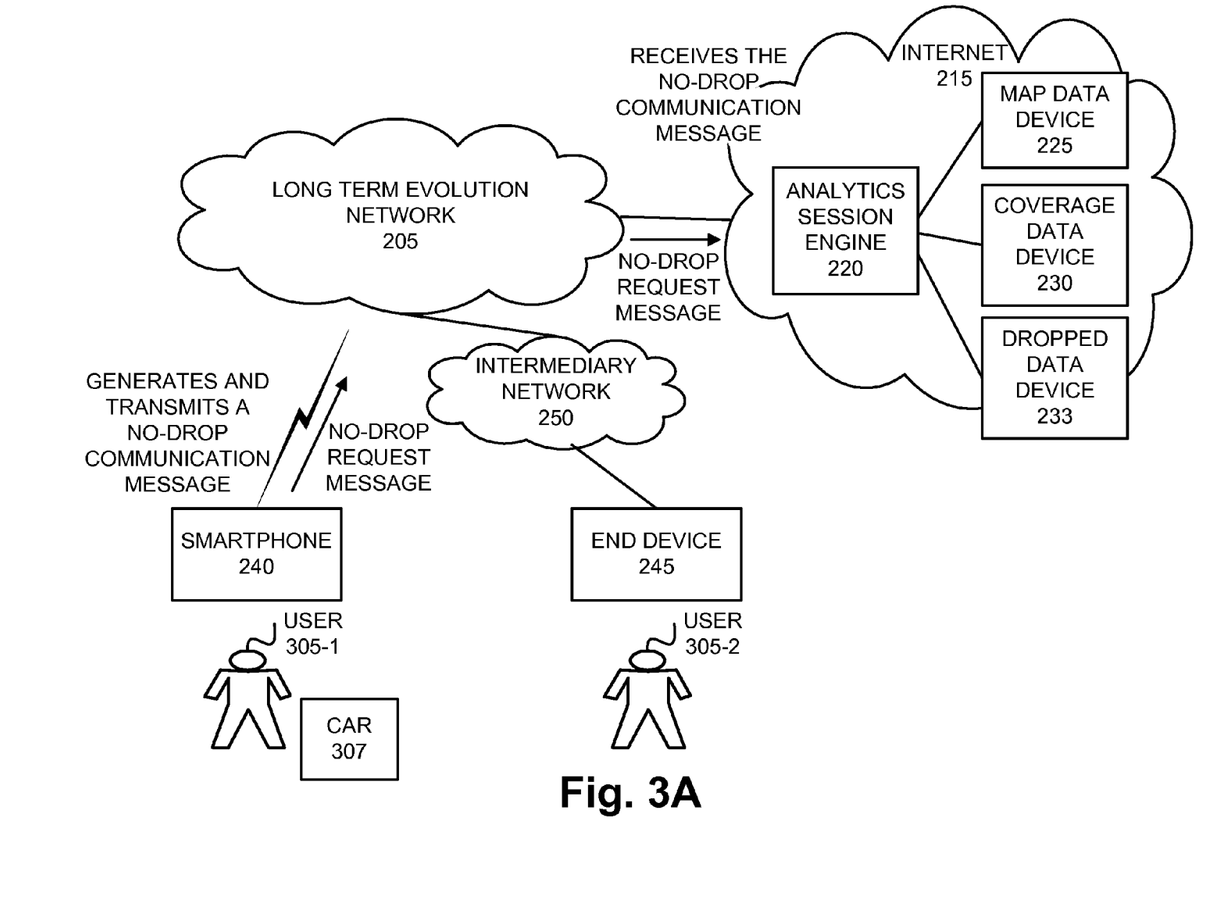
FIGS. 3A-3C are diagrams illustrating an exemplary process pertaining to a navigation service in support of the maintenance of mobile communication sessions according to an exemplary scenario.
Figure 3B:
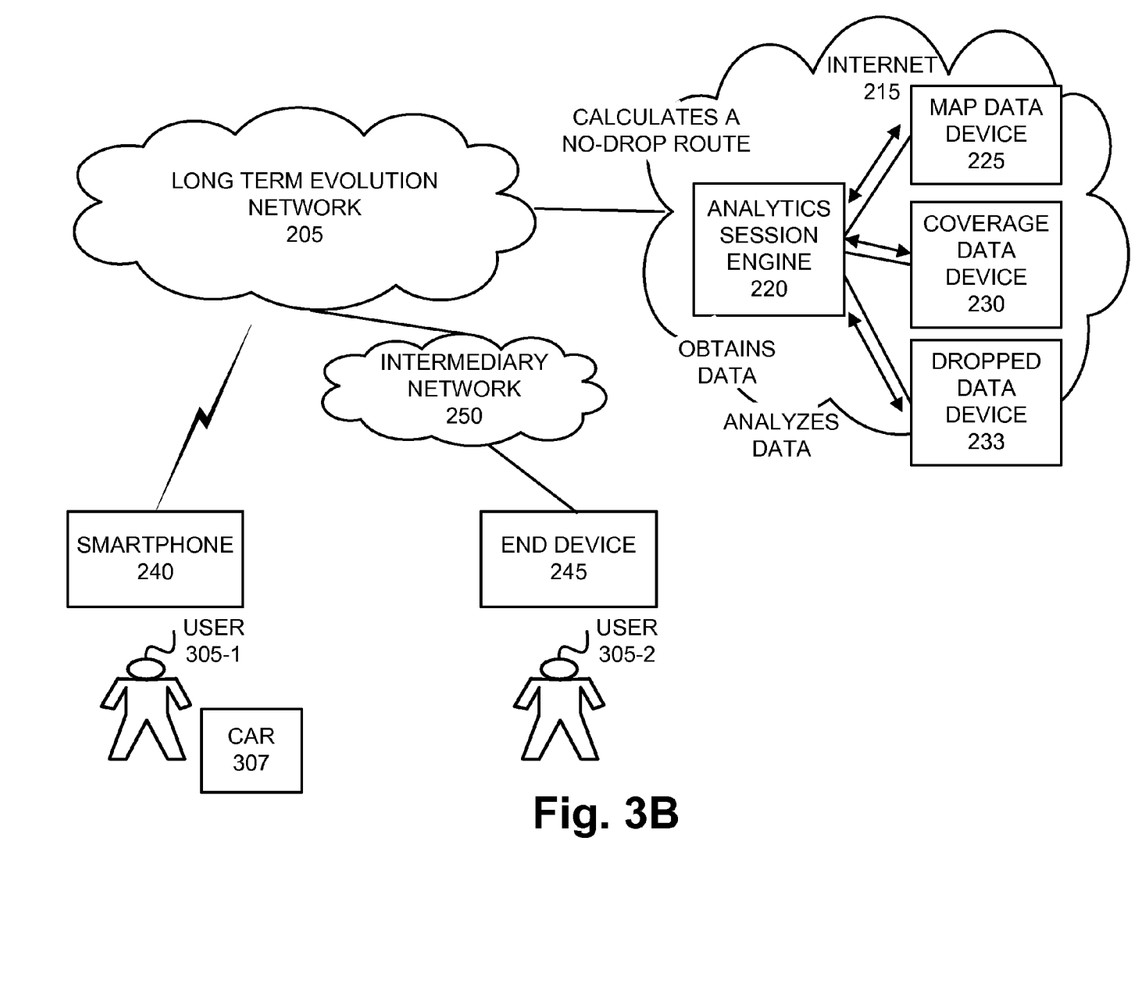
Figure 3C:
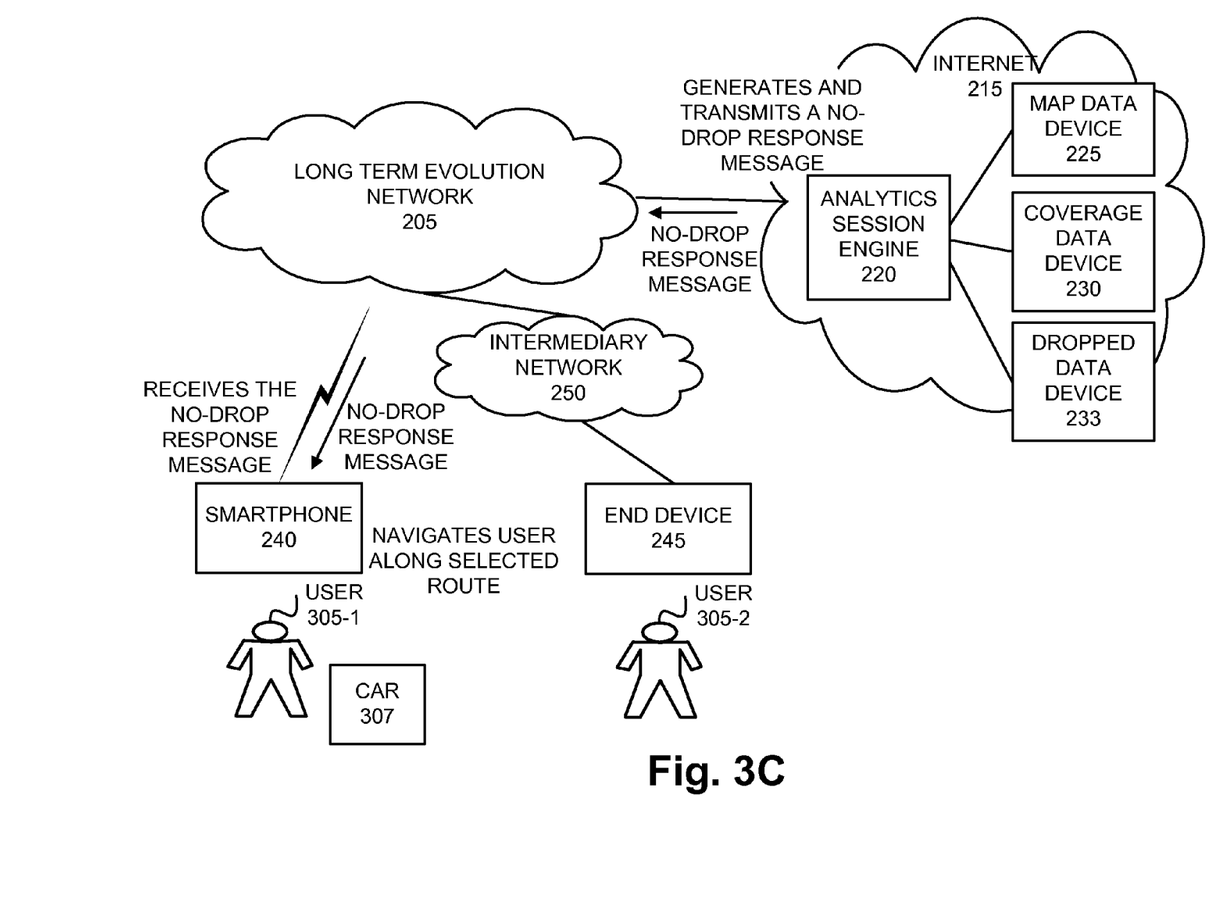

FIGS. 3A-3C are diagrams illustrating an exemplary process pertaining to the navigation service. Referring to FIG. 3A, assume a user 305-1 is traveling in a car 307 while connected to LTE network 205 via smartphone 240. For example, user 305-1 is traveling to visit a new client. User 305-1 has entered a destination (e.g., the new client's business address) via a graphical user interface of smartphone 240 and is receiving turn-by-turn instructions. Analytics session engine 220 is providing this conventional navigational service. On the way to the new client, user 305-1 needs to place a telephone call to an existing client (i.e., user 305-2) and end device 245, and does not want the telephone call to prematurely terminate. User 305-1 invokes the session maintenance service via a graphical user interface or a voice command. User 305-1 may specify other criterion in combination with the session maintenance service, such as fastest route, shortest distance, no tolls, etc. According to this exemplary scenario, assume user 305-1 indicates a fastest route. Thereafter, user 305-1 places a hands-free telephone call to user 305-2 and a telephone session begins.

In response, smartphone 240 generates a no-drop request message. The no-drop request message includes data indicating session maintenance and fastest route. Additionally, in response to the invocation of the session maintenance service, smartphone 240 obtains the location of smartphone 240. Smartphone 240 may obtain or calculate position information based on terrestrial-based and/or satellite-based positioning systems. For example, a variety of technologies or techniques may be used to obtain position information, such as satellite positioning (e.g., Global Positioning System (GPS), Differential GPS (DGPS), Galileo, etc.), cellular positioning (e.g., triangulation, Enhanced Observed Time Difference (E-OTD), Uplink Time Difference of Arrival (U-TDOA), assisted GPS, etc.), etc. These technologies may provide position information (e.g., geographic coordinates, etc.) with different degrees of precision or accuracy. Additionally, in response to the invocation of the session maintenance service, smartphone 240 measures signal quality relative to its connection with LTE network 205. For example, relative to LTE network 205, smartphone 240 may measure a received signal strength indicator (RSSI), a reference signal received quality (RSRQ), a reference signal received power (RSRP), other types of physical layer measurements, and/or other types of connectivity-based measurements (e.g., channel state information (CSI), etc.). Smartphone 240 includes the signal measurements in the no-drop request message. Smartphone 240 may perform signal quality measurements relative to other wireless networks in the geographic area and may include these measurements in the no-drop request message. The no-drop request message may indicate a mode of mobility and/or other types of data (e.g., type of session that is to be maintained). For example, user 305-1 may indicate that his or her mode of mobility is by vehicle and communication session is a telephone call. As illustrated, smartphone 240 transmits the no-drop request message to analytics session engine 220. Analytics session engine 220 receives the no-drop request message.

Referring to FIG. 3B, in response to receiving the no-drop request message, analytics session engine 220 obtains various types of data, such as map data from map data device 225, network coverage data from coverage data device 230, and historical dropped data from dropped data device 233. Analytics session engine 220 analyzes the data included in the no-drop request message, the map data, the network coverage data, and the historical dropped data to calculate a route that adheres to the criteria specified in user 305-1's request. Analytics session engine 220 identifies routes toward the destination (i.e., the new client's business address) based on the user 305-1's current and prospective/projected location. For example, analytics session engine 220 identifies a prospective location of the user based on the mode of mobility of the user (e.g., walking, by car, etc.), the location information included in the no-drop request message, and an estimated round-trip time that is an approximate time period equivalent to the time the no-drop request message is transmitted from smartphone 240 to when a no-drop response message is received by smartphone 240.

According to this exemplary scenario, assume that user 305-1 may travel two different routes to reach the destination. According to these circumstances, analytics session engine 220 analyzes the data in view of the different routes. For example, analytics session engine 220 may calculate distances from nodes (e.g., eNBs, etc.) of LTE network 205 relative to user 305-1's current and prospective locations. Analytics session engine 220 identifies the weather conditions in the geographical area, current and predictive load conditions pertaining to links that are subject to habitual congestion and would negatively impact user 305-1's session, and identifies if any dead spots exist on or proximate to roads on which car 307 may travel toward the destination. Analytics session engine 220 may identify a dead spot based on the dropped data (e.g., a location with very high DCP) and/or use of map data, such as an identification of a man-made obstacle (e.g., a tunnel, etc.), natural impediment (e.g., a mountain, etc.). Analytics session engine 220 may also compare current context data with historical dropped data to select a dropped communication probability. For example, a dropped communication probability may be (previously) calculated based on the historical dropped data directed to the current and prospective locations of user 305-1. According to an exemplary implementation, analytics session engine 220 selects the dropped communication probability that best matches the current conditions.

According to another exemplary implementation, analytics session engine 220 adjusts the value of the selected dropped communication probability based on differences in the historical context data on which the dropped communication probability was calculated relative to the current context data. For example, assume that the current and predictive load conditions are better than historical average load conditions on which the dropped communication probability is based. Analytics session engine 220 may reduce the value of the dropped communication probability (e.g., based on interpolation). According to another example, assume that the historical weather conditions are better than the weather conditions included in the current context data. Analytics session engine 220 may increase the value of the dropped communication probability.

Analytics session engine 220 selects a no-drop route based on the data analysis and calculations. For example, according to this example, analytics session engine 220 determines that one of the routes provides a greater degree of confidence that the session will be maintained and satisfies the fastest route criterion. According to an exemplary embodiment, analytics session engine 220 uses network policies, rules, and/or heuristics as a basis for selecting a route. For example, according to an exemplary implementation, analytics session engine 220 selects a route based on an objective to service as many users as possible or based on an objective to service the session to be maintained with the highest bitrate possible. While the exemplary implementations are not intended to be exhaustive, various embodiments not specifically described may be implemented that allows an administrator to configure analytics session engine 220 to select a route in support of maintenance of a mobile communication session in accordance with various objectives, considerations, etc.

Referring to FIG. 3C, analytics session engine 220 generates a no-drop response message. The no-drop response message may indicate one or multiple routes. According to this example, the no-drop response message indicates the selected route. Analytics session engine 220 transmits the no-drop response message to smartphone 240. Smartphone 240 receives the no-drop response message. In response to receiving the no-drop response message, the navigation agent or client guides user 305-1 along the selected route. For example, the navigation agent or client causes smartphone 240 to highlight the selected route via a displayed map. According to other examples in which auditory cues would not be disruptive, the navigation agent of smartphone 240 may issue a vocal command to user 305-1 to take the selected route. For example, user 305-1 may be downloading a large file and an auditory cue would not be disruptive. Still further other examples may be envisioned. For example, car 307 may include a navigation system that includes the navigation agent. User 305-1 may invoke the session maintenance service via the navigation system, while user 305-1 places a hands-free telephone call via smartphone 240. According to this example, the navigation service provider may have an on-boarding process in which user 305-1 provides his or her mobile phone service provider and other information (e.g., type of user device, etc.). In this way, the navigation system may calculate and select a route that yields the highest probability of maintaining the telephone call using the mobile phone service provider's wireless network.

The exemplary process described in FIGS. 3A-3C may continue in a similar manner until user 305-1 terminates the telephone call. For example, smartphone 240 transmits no-drop request messages that include the location of smartphone 240, signal quality, etc. In turn, analytics session engine 220 transmits no-drop response messages. According to an exemplary implementation, user 305-1 may select the frequency at which no-drop messages are transmitted via the navigation agent or client.

Figure 4:
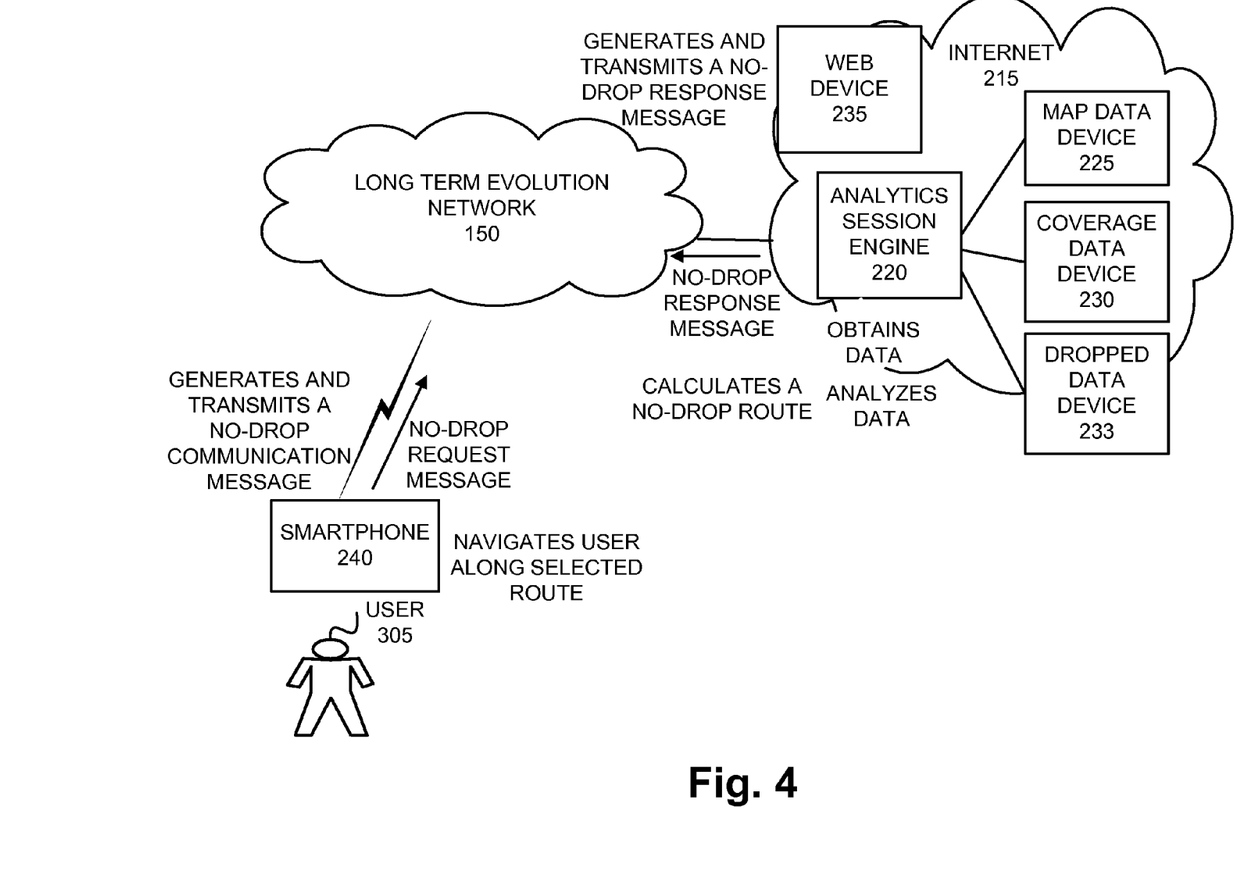
FIG. 4 is a diagram illustrating another exemplary process pertaining to the navigation service in support of the maintenance of mobile communication sessions according to an exemplary scenario.

FIG. 4 is a diagram illustrating another exemplary process pertaining to the navigation service. Referring to FIG. 4, assume user 305 is walking and shopping downtown and decides to place an audio/video call via smartphone 240 to a friend. User 305 opens a client application to initiate the video call and a call session is established via web device 235. Additionally, user 305 opens a navigation application that includes the session maintenance service. According to this example, user 305 selects a store several blocks away as a destination. Since user 305 would like to have the largest possible window for the video call, user 305 may configure a size of the window of the navigation application to be very small or may minimize the navigation application in which directions to the selected route are provided as taskbar messages. According to this example, assume user 305 minimizes the navigation application.

As illustrated in FIG. 4, smartphone 240 generates and transmits a no-drop request message. The no-drop message includes a location of smartphone 240 and a signal quality measurement. The no-drop message may also include the type of session (e.g., a real-time video session). Analytics session engine 220 receives the no-drop request message. In a manner previously described, analytics session engine 220 obtains and analyzes data (e.g., map data, network coverage data, data received from smartphone 240, etc.). Analytics session engine 220 identifies possible routes to the store and finds one route to include a dead spot in coverage. As a result, analytics session engine 220 selects a route that is somewhat longer in distance but does not include any dead spot and yields a high probability of maintaining the video call without service interruption. Analytics session engine 220 generates and transmits a no-drop response message.

Smartphone 240 receives the no-drop response message. In response, the navigation agent generates and displays a route message (e.g., turn left onto $5^{th}$ Street). During the video call, user 305 notices the route message and proceeds to $5^{th}$ Street.

The navigation agent or client may be implemented in various ways. For example, the agent may be implemented as a plugin to a navigation application. Alternatively, the navigation agent or client may be implemented as a stand-alone application. According to an exemplary embodiment, the navigation agent runs as a background service on a user device.

Figure 5:
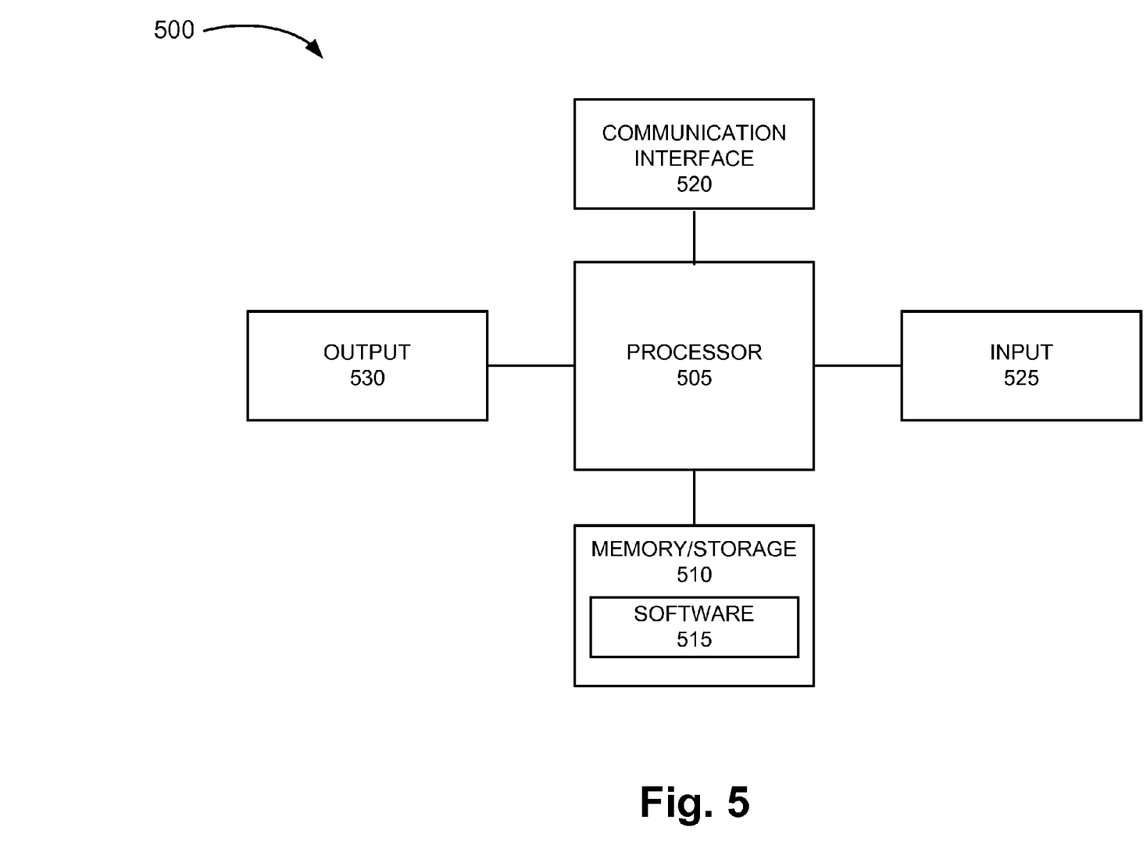
FIG. 5 is a diagram illustrating exemplary components of a device that may correspond to one or more of the devices in the exemplary environment depicted in FIG. 1.

FIG. 5 is a diagram illustrating exemplary components of a device 500 that may correspond to one or more of the devices in the environments described herein. For example, device 500 may correspond to network device 110 (e.g., analytics session engine, etc), user device 140, as well as other network devices. As illustrated, according to an exemplary embodiment, device 500 includes a processor 505, memory/storage 510 that stores software 515, a communication interface 520, an input 525, and an output 530. According to other embodiments, device 500 may include fewer components, additional components, different components, and/or a different arrangement of components than those illustrated in FIG. 5 and described herein.

Processor 505 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 505 may be implemented as hardware (e.g., a microprocessor, etc.), a combination of hardware and software (e.g., a SoC, an ASIC, etc.), may include one or multiple memories (e.g., cache, etc.), etc.

Processor 505 may control the overall operation or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., a network, another device, etc.).

Memory/storage 510 includes one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 510 may store data, software, and/or instructions related to the operation of device 500.

Software 515 includes an application or a computer program that provides a function and/or a process. Software 515 may include firmware. For example, with reference to analytics session engine 220, software 515 may include an application that, when executed by processor 515, provides the functions as described herein. Additionally, for example, with reference to the agent of user device 140, software 515 may include an application that, when executed by processor 515, provides the functions as described herein.

Communication interface 520 permits device 500 to communicate with other devices, networks, systems, etc. Communication interface 520 may include one or multiple wireless interfaces and/or wired interfaces. Communication interface 520 may include one or multiple transmitters and receivers or transceivers. Communication interface 520 may include a GPS receiver. Communication interface 520 may operate according to a protocol and a communication standard.

Input 525 permits an input into device 500. For example, input 525 may include a keyboard, a mouse, a display, a touchscreen, a touchless screen, a button, a switch, an input port, speech recognition logic, and/or some other type of visual, auditory, tactile, etc., input component. Output 530 permits an output from device 500. For example, output 530 may include a speaker, a display, a touchscreen, a touchless screen, a light, an output port, and/or some other type of visual, auditory, tactile, etc., output component.

Device 500 may perform a process and/or a function, as described herein, in response to processor 505 executing software 515 stored by memory/storage 510. By way of example, instructions may be read into memory/storage 510 from another memory/storage 510 (not shown) or read from another device (not shown) via communication interface 520. The instructions stored by memory/storage 510 may cause processor 505 to perform a process described herein. Alternatively, for example, according to other implementations, device 500 may perform a process described herein based on the operation of hardware (processor 505, etc.).

Figure 6:
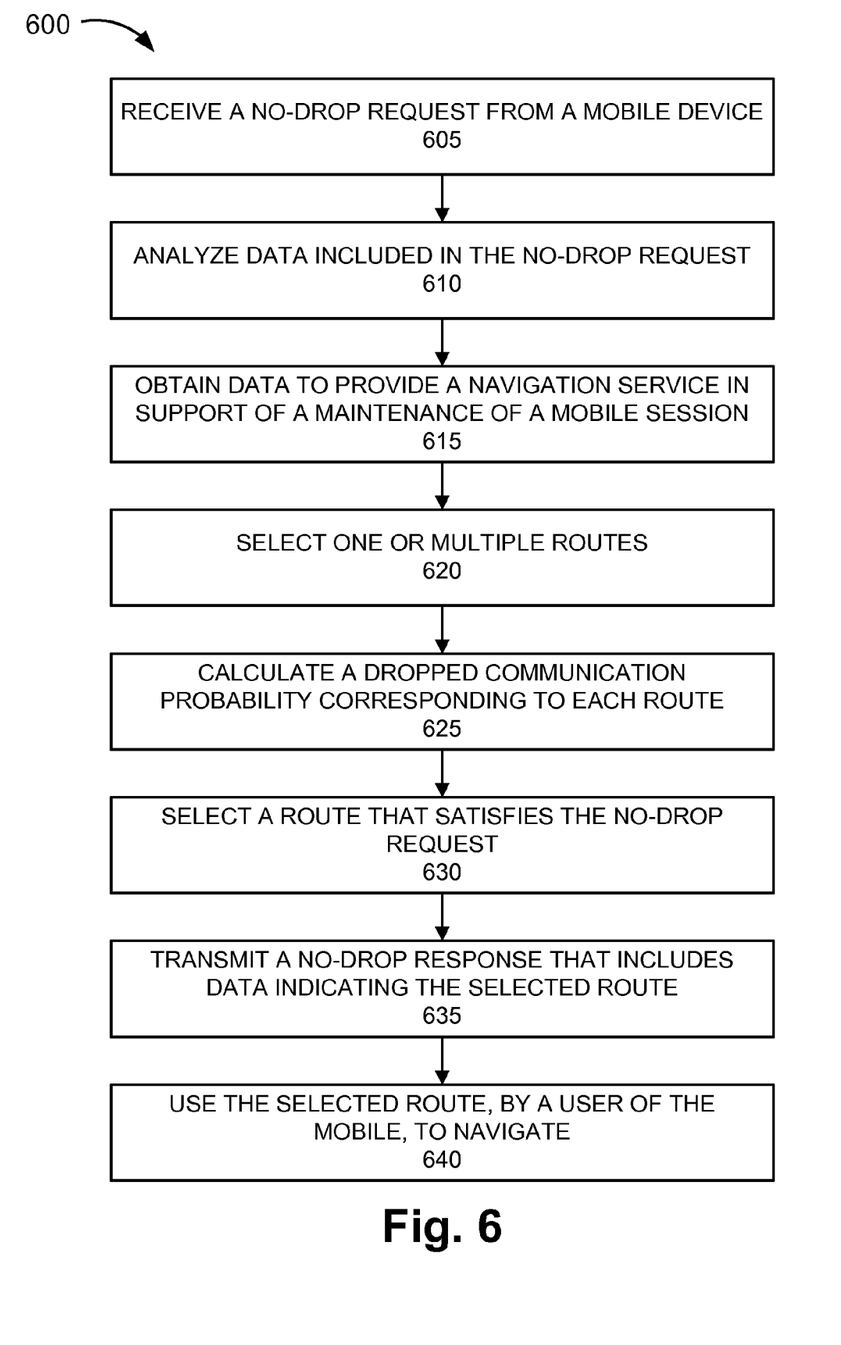
FIG. 6 is a flow diagram illustrating an exemplary process pertaining to the navigation service in support of the maintenance of mobile communication sessions.

FIG. 6 is a flow diagram that illustrates an exemplary process 600 pertaining to the navigation service in support of the maintenance of mobile communication sessions. Process 600 is directed to a process previously described above with respect to FIGS. 3A-3C and elsewhere in this description, in which analytics session engine 220 provides the navigation service. According to an exemplary embodiment, analytics session engine 220 performs steps described in process 600. For example, processor 505 may execute software 515 to perform the steps described.

Referring to FIG. 6, process 600 begins, in block 605, in which a no-drop request is received from a mobile device. For example, analytics session engine 220 receives a no-drop request from user device 140. The no-drop request includes data indicating a location of user device 140, data indicating a signal quality pertaining to a connection between user device 140 and wireless network 105, and data indicating a destination to which a user of user device 140 is traveling. The no-drop request may include other types of data, such as criterion (e.g. fastest route, etc.), in addition to a criterion that the route supports maintenance of a mobile communication session. The no-drop request may also include context data, such as a mode of mobility (e.g., by car, pedestrian, etc.), type of communication session to be maintained, speed of travel, and/or user device capabilities (e.g., wireless capabilities, multimode, etc.). Additionally, a user of user device 140 may specify a confidence level (e.g., extremely high, high, medium, etc.) pertaining to session maintenance, which may be included in the no-drop request.

In block 610, the data included in the no-drop request is analyzed. For example, analytics session engine 220 identifies the destination of the user and the location of user device 140. Analytics session engine 220 may identify other data included in the no-drop request.

In block 615, data to provide a navigation service in support of the maintenance of a mobile session is obtained. For example, analytics session engine 220 obtains map data and network coverage data based on the data analyzed in the no-drop request. For example, the data in the no-drop request may be used as a key to access data stored by map data device 225, coverage data device 230, and/or dropped data device 233.

In block 620, one or multiple routes are selected. For example, analytics session engine 220 selects one or multiple routes at or near the user's current/prospective location that lead to the destination.

In block 625, a dropped communication probability corresponding to each route is calculated. For example, analytics session engine 220 calculates or selects a previously calculated dropped communication probability (e.g., stored by dropped data device 233) corresponding to each route. Analytics session engine 220 may adjust the value of the dropped communication probability based on differences between the context data that was used to generate the dropped communication probability and the current context data.

In block 630, a route that satisfies the no-drop request is selected. For example, analytics session engine 220 selects a route that best satisfies the no-drop request. By way of further example, analytics session engine 220 selects the route that has the lowest dropped communication probability value.

In block 635, a no-drop response that includes data indicating the selected route is transmitted. For example, analytics session engine 220 generates and transmits the no-drop response to user device 140.

In block 640, the selected route is used by a user of the mobile device to navigate. For example, user device 140 receives the no-drop response. The selected route is presented to the user of user device 140 and allows the user to follow the route. Process 600 ends.

Although FIG. 6 illustrates an exemplary process 600, according to other embodiments, process 600 may include additional operations, fewer operations, and/or different operations than those illustrated in FIG. 6 and described herein. For example, process 600 may repeat or loop within blocks 615 to 640 until the user reaches the destination. Since a user that is a pedestrian may be less restricted, in terms of available routes, relative to a user that is driving in a vehicle, the repetition or looping of blocks 615 to 640 may be different. For example, when the user is driving in a car and there is only one road to drive on, the repetition or looping of some steps of process 600 may be considered unnecessary during this period of time. In contrast, when the user is walking, absent the presence of obstacles (e.g., buildings, etc.), the repetition or looping of some steps of process 600 may be helpful and occur more frequently. Additionally, user device 140 may transmit update messages that include, for example, current position, signal quality, etc., to analytics engine 220 so that analytics session engine 220 may provide the no-drop service in a continuous manner and until the user reaches the destination. Additionally, analytics engine 220 may use the information included in the update messages to identify when one or more steps of process 600 should be performed. For example, when the user is driving in the car and the user's current location is proximate to a road intersection, analytics engine 220 identifies the presence of the intersection in block 615, and process 600 continues through a loop.

Figure 7:
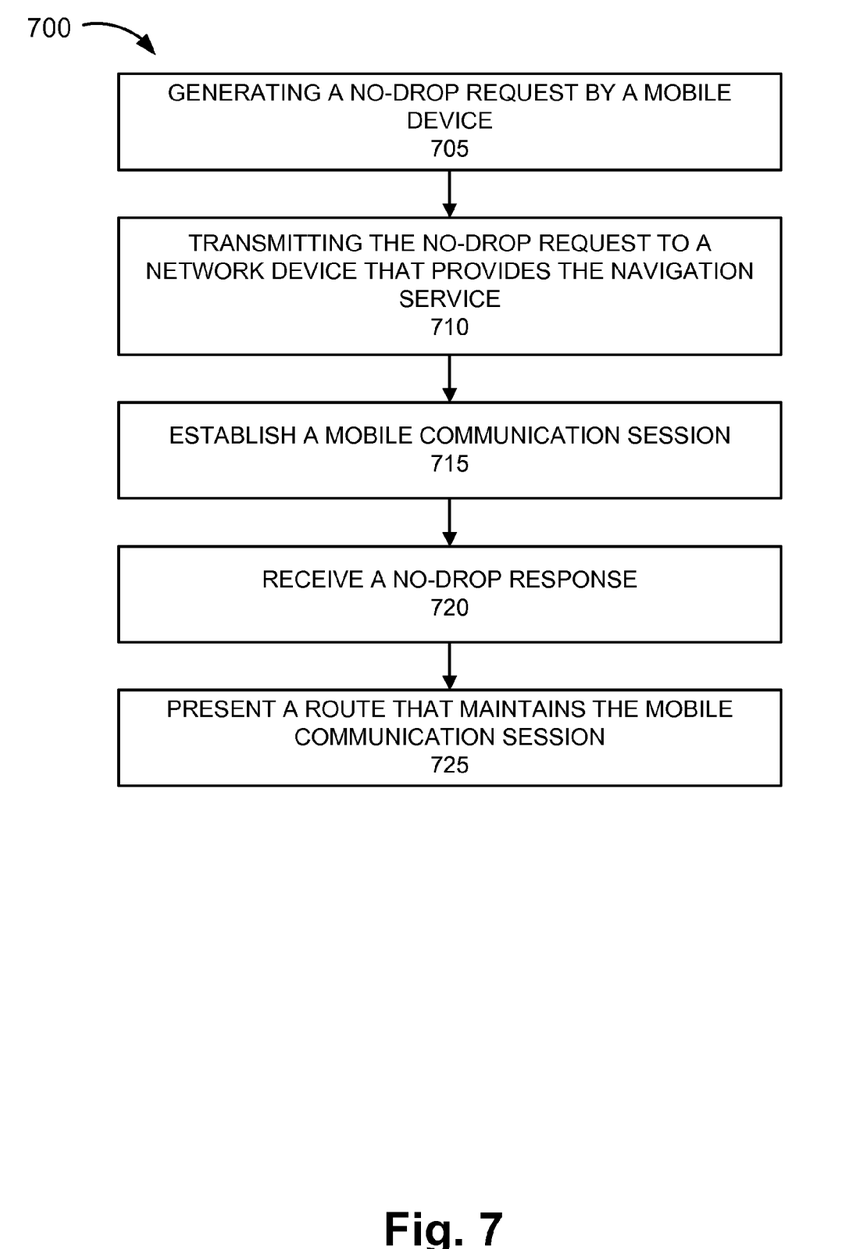
FIG. 7 is a flow diagram illustrating another exemplary process pertaining to the navigation service in support of the maintenance of mobile communication sessions.

FIG. 7 is a flow diagram illustrating another exemplary process 700 pertaining to the navigation service in support of the maintenance of mobile communication sessions. Process 700 is directed to a process previously described above with respect to FIGS. 3A-3C and elsewhere in this description, in which an agent of user device 140 provides the navigation service. According to an exemplary embodiment, the agent of user device 140 performs steps described in process 700. For example, processor 505 may execute software 515 to perform the steps described.

Referring to FIG. 7, process 700 begins, in block 705, in which a no-drop request is generated by a mobile device. For example, a user of user device 140 invokes the navigation service. The agent of user device 140 generates a no-drop request. The no-drop request includes data indicating a location of user device 140, data indicating a destination to which the user of user device 140 is traveling, and data indicating a signal quality pertaining to a connection between user device 140 and wireless network 105. The no-drop request may include other data, as previously described, in block 605 of process 600 and elsewhere in this description. One or multiple instances of the data (e.g., user device 140 capabilities, etc.) included in the no-drop request may be stored by user device 140 and automatically included in the no-drop request. Additionally, the agent of user device 140 may include a graphical user interface to allow the user to set user preferences pertaining to the navigation service. For example, the user may set preferences pertaining to confidence levels of session maintenance, other criteria pertaining to a route (e.g., fastest, shortest, etc.), and type of communication session (e.g., telephone calls, etc.).

In block 710, the no-drop request is transmitted to a network device that provides the navigation service. For example, user device 140 transmits the no-drop request to analytics session engine 220 via wireless network 105.

In block 715, a mobile communication session is established. For example, user device 140 establishes a mobile communication session. As previously described, the mobile communication session may be a user-to-user session, a user-to network device session, or a machine-to-machine session. By way of further example, the mobile communication session may be a telephone call, an audio/video call, an IM session, downloading a file, streaming a program, web surfing, monitoring a utility meter, or any other communication session in which the user wants to minimize/prevent communication dropout of the session.

In block 720, a no-drop response is received. For example, user device 140 receives the no-drop response from analytics session engine 220. The agent of user device 140 inspects the data indicating the route included in the no-drop response.

In block 725, a route, which maintains the mobile communication session, is presented. For example, the agent of user device 140 provides visual and/or audio guidance of the route to the user. For example, the agent may provide a map indicating the route, a taskbar message, and/or vocal commands that lead the user along the route. Process 700 ends.

Although FIG. 7 illustrates an exemplary process 700, according to other embodiments, process 700 may include additional operations, fewer operations, and/or different operations than those illustrated in FIG. 7 and described herein. For example, as previously described, the agent of user device 140 may transmit update messages to analytics session engine 220. The update messages may include the current location of user device 140, signal quality measurements, etc. User device 140 receives a no-drop response indicating a route toward the destination. In this regard, one or more steps of process 700 may repeat until the user reaches the destination.

The foregoing description of embodiments provides illustration, but is not intended to be exhaustive or to limit the embodiments to the precise form disclosed. Accordingly, modifications to the embodiments described herein may be possible. For example, according to other embodiments, the The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 505, etc.), or a combination of hardware and software (e.g., software 515). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive. For example, various other well-known strategies that reduce communication dropping may be used in combination with an embodiment described herein to reduce the probability communication dropping.

Additionally, according to an exemplary embodiment, analytics session engine 220 calculates a communication blocking probability (CBP). The communication blocking probability indicates a probability of a blocked communication (e.g., when a user attempts to begin a session via wireless network 105). Analytics session engine 220 selects a route that minimizes (e.g., to a specific degree or confidence level) the user's chance of a blocked communication. Analytics session engine 220 may use any of well-known formulae to calculate the communication blocking probability.

Additionally, although the environment of mobile users of the navigation service have been implicitly described in terms of an outdoor environment, embodiments described herein may be implemented in an indoor environment (e.g., within a building, a home, etc.). For example, wireless network 105 may be implemented by a WiFi system and an indoor positioning system (e.g., Wireless Local Area Network (WLAN) positioning, Bluetooth positioning, IEEE 802.11 positioning, Ultra Wide Band (UWB) positioning, indoor positioning with GPS, etc.). In this way, a user may be provided a route to maintain a session while indoors or maintain a session while moving from an indoor environment to an outdoor environment or vice versa. For example, a user may establish a session while walking in the lobby of a building and then exit to the street. The navigation service may assist in maintaining the session and minimize communication dropout by providing the user with a route.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 510.

No element, act, or instruction described in the present application should be construed as critical or essential to the embodiments described herein unless explicitly described as such.

To the extent the aforementioned embodiments collect, store or employ personal information provided by users, it should be understood that such information shall be used in accordance with all applicable laws concerning protection of personal information. Additionally, the collection, storage and use of such information may be subject to consent of the user to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   receiving, by the network device, a no-drop request from a mobile device that includes data indicating a signal quality pertaining to a connection between the mobile device and a wireless network, data indicating a location of the mobile device, and data indicating a destination to which a user of the mobile device is traveling;
   selecting, by the network device, one or more routes based on the no-drop request;
   obtaining, by the network device, map data and network coverage data pertaining to the wireless network;
   determining, by the network device, which of the one or more routes yields a probability that a communication session between the mobile device and another device avoids communication dropout based on the no-drop request, the one or more routes, the map data and the network coverage data;

selecting, by the network device, at least one of the one or more routes in response to the determining;

generating, by the network device, a no-drop response that includes data indicating the at least one of the one or more routes; and transmitting, by the network device, the no-drop response to the mobile device.

2. The method of claim 1, wherein the obtaining further comprises:

obtaining no-drop historical data that includes a dropped communication probability relative to a geographical location and context data; and wherein the determining further comprises:

determining which of the one or more routes yields the probability that the communication session between the mobile device and the other device avoids communication dropout based on the no-drop historical data.

3. The method of claim 1, wherein the no-drop request includes data indicating a type of communication session to be maintained and data indicating wireless capabilities of the mobile device, and wherein the obtaining further comprises:

obtaining network load data pertaining to the wireless network, and wherein the determining further comprises:

determining which of the one or more routes yields the probability that the communication session between the mobile device and the other device avoids communication dropout based on the network load data.

4. The method of claim 1, wherein the no-drop request includes data indicating a request for one of a fastest route or a shortest route, and wherein the map data indicates geographical locations of wireless nodes of the wireless network, the method further comprising:

calculating a distance between the mobile device to one of the wireless nodes of the wireless network, and wherein the determining further comprises:

determining which of the one or more routes yields the probability that the communication session between the mobile device and the other device avoids communication dropout based on the distance.

5. The method of claim 1, wherein the obtaining further comprises:

obtaining no-drop historical data that includes a dropped communication probability value relative to a geographical location and historical context data;

comparing the historical context data with which the dropped communication probability value was calculated to current context data pertaining to the mobile device; and increasing or decreasing the dropped communication probability value based on the comparing.

6. The method of claim 1, wherein the no-drop request includes data indicating a user-requested confidence level of no-dropped communication, which pertains to the communication session, out of a set of possible user-requested confidence levels.

7. The method of claim 1, wherein the no-drop request includes data indicating a mode of mobility of the user, and the method further comprising:

calculating predictive network load conditions pertaining to the wireless network; and calculating a prospective location of the mobile device based on the data indicating the location of the mobile device and the mode of mobility.

8. The method of claim 1, further comprising:

receiving, by the mobile device, the no-drop response; and providing, by the mobile device and to the user, a cue indicating the at least one of the one or more routes to use to reach the destination.

9. A network device comprising:

a communication interface, wherein the communication interface includes a transmitter and a receiver;

a memory, wherein the memory stores instructions; and a processor, wherein the processor executes the instructions to:

receive, via the communication interface, a no-drop request from a mobile device that includes data indicating a signal quality pertaining to a connection between the mobile device and a wireless network, data indicating a location of the mobile device, and data indicating a destination to which a user of the mobile device is traveling;

select one or more routes based on the no-drop request;

obtain map data and network coverage data pertaining to the wireless network;

determine which of the one or more routes yields a probability that a communication session between the mobile device and another device avoids communication dropout based on the no-drop request, the one or more routes, the map data and the network coverage data;

select at least one of the one or more routes in response to a determination of the one or more routes;

generate a no-drop response that includes data indicating the at least one of the one or more routes; and transmit, via the communication interface, the no-drop response to the mobile device.

10. The network device of claim 9, wherein, when obtaining, the processor further executes the instructions to:

obtain no-drop historical data that includes a dropped communication probability relative to a geographical location and context data; and wherein, when determining, the processor further executes the instructions to:

determine which of the one or more routes yields the probability that the communication session between the mobile device and the other device avoids communication dropout based on the no-drop historical data.

11. The network device of claim 9, wherein, when obtaining, the processor further executes the instructions to:

obtain network load data pertaining to the wireless network; and wherein, when determining, the processor further executes the instructions to:

determine which of the one or more routes yields the probability that the communication session between the mobile device and the other device avoids communication dropout based on the network load data.

12. The network device of claim 9, wherein, when obtaining, the processor further executes the instructions to:

obtain no-drop historical data that includes a dropped communication probability value relative to a geographical location and historical context data;

compare the historical context data with which the dropped communication probability value was calculated to current context data pertaining to the mobile device; and increase or decrease the dropped communication probability value based on a comparison, and wherein the current context data pertaining to the mobile device includes weather conditions.

13. The network device of claim 9, wherein the processor further executes the instructions to:

calculate a distance between the mobile device to a node of the wireless network; and wherein, when determining, the processor further executes the instructions to:

determine which of the one or more routes yields the probability that the communication session between the mobile device and the other device avoids communication dropout based on the distance.

14. The network device of claim 9, wherein the no-drop request includes data indicating a mode of mobility of the user, and wherein the processor further executes the instructions to:

calculate predictive network load conditions pertaining to the wireless network; and calculate a prospective location of the mobile device based on the data indicating the location of the mobile device and the mode of mobility.

15. The network device of claim 9, wherein the no-drop request includes data indicating a user-requested confidence level of no-dropped communication, which pertains to the communication session, out of a set of possible user-requested confidence levels.

16. A non-transitory storage medium storing instructions executable by a computational device to:

receive a no-drop request from a mobile device that includes data indicating a signal quality pertaining to a connection between the mobile device and a wireless network, data indicating a location of the mobile device, and data indicating a destination to which a user of the mobile device is traveling;

select one or more routes based on the no-drop request;

obtain map data and network coverage data pertaining to the wireless network;

determine which of the one or more routes yields a probability that a communication session between the mobile device and another device avoids communication dropout based on the no-drop request, the one or more routes, the map data and the network coverage data;

select at least one of the one or more routes in response to a determination of the one or more routes;

generate a no-drop response that includes data indicating the at least one of the one or more routes; and transmit the no-drop response to the mobile device.

17. The non-transitory storage medium of claim 16, wherein the instructions to obtain comprise further instructions executable by the computational device to:

obtain no-drop historical data that includes a dropped communication probability relative to a geographical location; and wherein the instructions to determine comprise further instructions executable by the computational device to:

determine which of the one or more routes yields the probability that the communication session between the mobile device and the other device avoids communication dropout based on the no-drop historical data.

18. The non-transitory storage medium of claim 16, wherein the no-drop request includes data indicating a request for one of a fastest route or a shortest route, and the non-transitory storage medium further storing instructions executable by the computational device to:

afford a higher priority, when a selection of the at least one of the one or more routes occurs, to the probability that the communication session avoids communication dropout than to the one of the fastest route or the shortest route.

19. The non-transitory storage medium of claim 16, wherein the map data indicates geographical locations of wireless nodes of the wireless network.

20. The non-transitory storage medium of claim 16, wherein the no-drop request includes data indicating a type of communication session to be maintained and data indicating wireless capabilities of the mobile device.

* * * * *